United States Patent [19]

Vermesse

[11] Patent Number: 5,399,981

[45] Date of Patent: Mar. 21, 1995

[54] CLOSED CONTINUOUS RESISTIVE TRACK ANGULAR POSITION SENSOR AND MEASUREMENT METHOD

[75] Inventor: Bernard Vermesse, L'Hay les Roses, France

[73] Assignee: Neopost Industrie, Bagneux, France

[21] Appl. No.: 986,044

[22] Filed: Dec. 4, 1992

[30] Foreign Application Priority Data

Dec. 9, 1991 [FR] France ................ 91 15223

[51] Int. Cl.⁶ ............................................ G08C 15/00
[52] U.S. Cl. .................................. 324/714; 324/716; 340/870.38; 33/1 PT
[58] Field of Search ............... 73/505; 33/1 PT; 324/713, 714, 715–716, 207.25; 338/13; 340/686, 870.38

[56] References Cited

U.S. PATENT DOCUMENTS

| 3,672,212 | 6/1972 | Caspary et al. | 73/765 |
| 4,631,540 | 12/1986 | Feldman | 33/1 PT |
| 4,991,301 | 2/1991 | Hore | 33/1 PT |
| 5,066,953 | 11/1991 | Lengenfelder et al. | 341/155 |
| 5,079,500 | 1/1992 | Oswald | 324/714 X |

FOREIGN PATENT DOCUMENTS

| 0211477 | 2/1987 | European Pat. Off. |
| 0333070 | 9/1989 | European Pat. Off. |
| 0444796 | 9/1991 | European Pat. Off. |
| 2199867 | 4/1974 | France |
| 2654238 | 6/1978 | Germany |
| 3838291 | 2/1990 | Germany |
| 2082329 | 3/1982 | United Kingdom |
| WO8908820 | 9/1989 | WIPO |

OTHER PUBLICATIONS

Patent Abstracts of Japan, vol. 10, No. 334 (p–515)(2390) Nov. 13, 1986 & JP-A-61 139 702 (NEC Corp.) Jun. 27, 1986.

Primary Examiner—Kenneth A. Wieder
Assistant Examiner—Christopher M. Tobin
Attorney, Agent, or Firm—Sughrue, Mion, Zinn, Macpeak & Seas

[57] ABSTRACT

An angular position sensor having at least one resistive track which is circular, for example, and at least one cursor. The cursor is adapted to move while in electric contact with the track. The track is closed and continuous and has at least two electric access points. The sensor cooperates with an arrangement for applying separate predetermined electric potentials to the access points and with an arrangement for measuring the resulting electric potential at one of the access points. The cursor is therefore able to rotate through a complete turn without leaving the one resistive track. All angles can be measured and rotation through several turns is possible.

9 Claims, 7 Drawing Sheets

CLOSED CONTINUOUS RESISTIVE TRACK ANGULAR POSITION SENSOR AND MEASUREMENT METHOD

BACKGROUND OF THE INVENTION

1. Field of the Invention

The field of the invention is that of measuring angles.

To be more precise, the invention concerns a sensor for determining the angular position of a cursor adapted to move and/or to be moved along a circular or more generally elliptical or even any shape closed path.

Sensors of this kind find applications in all types of devices and systems in which it is necessary to know the angular position of a member able to pivot about an axis.

2. Description of the Prior Art

Various more or less complex types of angular measuring device are already known. Thus there are contactless sensors based on inductive and/or capacitive electromagnetic circuits and electro-optical systems. These various devices are usually highly complex and often provide for only a small and finite number of distinct angle measurements.

Figure 9:
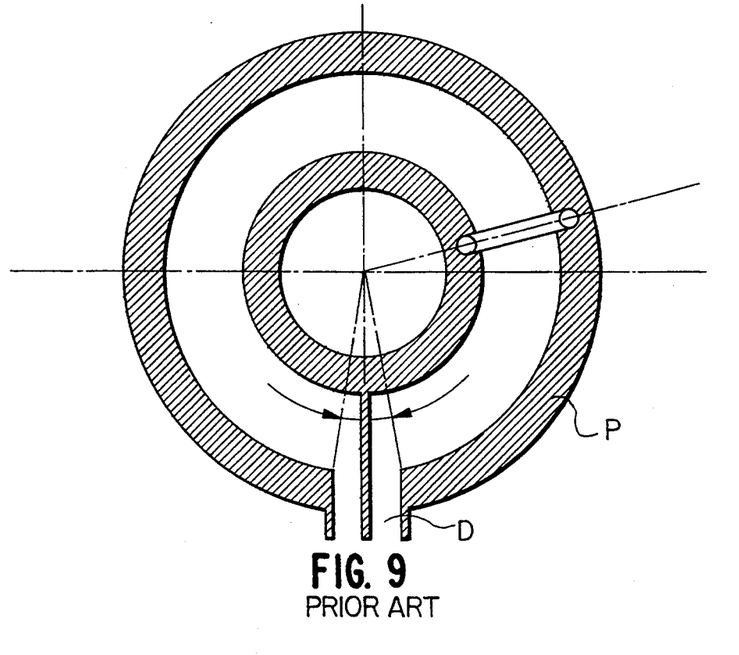
FIG. 9 is a simplified diagram of a prior art angular sensor.

Circular potentiometer sensors like that shown in FIG. 9 are also known. This known type device comprises two concentric tracks, a resistive outer track and a conductive inner track. A cursor rotating about the center of the two tracks short-circuits the tracks by means of two sliding contacts.

The resistive track is not continuous but has two ends between which a reference voltage may be applied. It will be understood that if a reference potential difference is applied between these two ends of the resistive track the voltage sensed at the conductive track is proportional to the angular position of the cursor.

This type of sensor therefore provides a simple way of measuring an angular position. It has a number of drawbacks, however, which restrict its use in many fields.

The major drawback of this device is that it requires a break in the circular resistive track to provide access to its ends so that the reference voltage can be applied. There is therefore a "dead" angle between these two ends within which it is not possible to measure the angle.

Mechanical abutments are usually provided to prevent the cursor from being positioned within this dead angle.

In this case displacement is limited physically, which makes it impossible to use the sensor in all cases in which the cursor is able to take up any angular position. Likewise, this sensor cannot be used if the cursor must be able to rotate more than once in each direction.

In some cases there are no mechanical abutments and the cursor can travel across the dead angle. In this case the sliding contact of the cursor leaves the resistive track between the start and the end of the dead angle. There is a break in the sliding motion which compromises the durability of the contact.

What is more, any position measurement carried out inside this dead angle yields a more or less random result which is not representative of the exact position of the cursor.

One objective of the invention is to palliate these various drawbacks of the prior art.

To be more precise an objective of the invention is to provide an angular position sensor enabling any angle between 0° and 360° to be measured continuously, the cursor being able to move over at least one complete revolution.

A specific objective of the invention is also to provide a sensor of this kind in which the position cursor can safely rotate through a plurality of turns in the same direction.

Another objective of the invention is to provide a sensor of this kind in which wear of the track and contacts is reduced and the durability of the sensor is increased.

Another objective of the invention is to provide a low cost sensor of this kind which is simple to manufacture and use industrially.

A further objective of the invention is to provide a method of determining the angular position measured by this sensor which is both simple and accurate.

SUMMARY OF THE INVENTION

These objectives, and others that will emerge hereinafter, are achieved in accordance with the invention by means of an angular position sensor comprising:

at least one closed continuous resistive track and at least one cursor adapted to move in electrical contact with said at least one track;

means for applying separate predetermined electric potentials to at least two access points to said at least one track; and means for measuring the resulting electric potential at said at least one cursor and deducing an angle value therefrom;

wherein, for each angle value, the potential application means apply separately first and second sets of DC potential values and the measuring means measure separately first and second sets of DC potential values.

Because the resistive track is continuous and closed there is no longer any dead angle. The cursor is therefore able to rotate over a complete turn without leaving the resistive track.

All angles can be measured and rotation through more than one turn is possible.

There is no break in the sliding motion of the cursor which limits wear of the track and increases the durability of the sensor.

The resistance per unit angle of the resistive track is advantageously constant. In this way the measured potential is a linear function of the angular position of the cursor.

The electrical access points to each resistive track are advantageously equidistant. This makes it possible to simplify subsequent processing of the measured values, as will be explained later.

In one advantageous embodiment of the invention a stub resistor is inserted between a resistive track and each access point thereof.

This stub resistor has a two-fold function:

if an access point of the resistive track is directly in contact with the resistive track the latter is then short-circuited across the full width of the access point and there is therefore a discontinuity of its linearity at this level; adding a stub resistor retains perfect linearity of the resistive circular track;

the presence of the stub resistor can facilitate processing if its value relative to the value of the resistance per unit angle of the resistive circular track is suitably chosen.

In one preferred embodiment of the invention the sensor comprises first and second resistive tracks each having two access points and a cursor, said potential application means maintain a first predetermined potential at a first access point of the first resistive track, a second predetermined potential at a second access point of the first resistive track, a third predetermined potential at a first access point of the second resistive track and a fourth predetermined potential at a second access point of the second track and said resultant electric potential measuring means measure the potentials present at the two cursors.

In one advantageous embodiment of the invention the processing means comprise an analog/digital converter and means for analyzing at least two values supplied by said converter producing data representative of the angle to be measured.

The value of the stub resistors is advantageously substantially equal to 8R/3 where R is the value of the resistance per unit angle of the resistive track.

The invention also concerns a method of measuring the angular position of the cursor of a sensor consisting in carrying out two consecutive measurements corresponding to two separate energization configurations and processing these two measurements to determine the value of the angle.

Other features and advantages of the invention will emerge from the following description of a preferred embodiment of the invention given by way of non-limiting example with reference to the appended drawings.

DETAILED DESCRIPTION OF THE INVENTION

As mentioned in the preamble, known type angular sensors like that shown in FIG. 9 feature a discontinuity D in the resistive track P which causes numerous problems.

Figure 1:
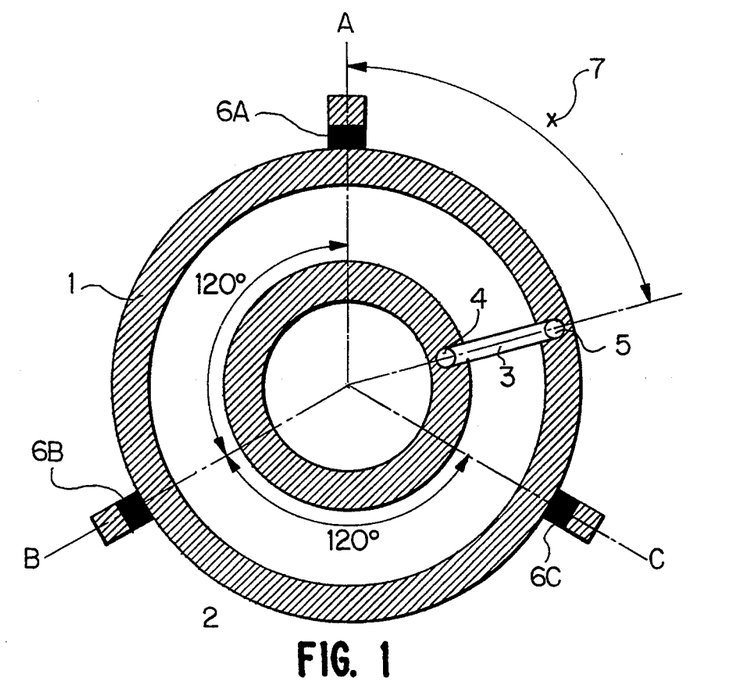
FIG. 1 is a simplified diagram of an angular sensor in accordance with the invention.

The invention provides a solution to these problems. A sensor in accordance with the invention as shown in FIG. 1 has a closed continuous resistive track 1 which enables the cursor 3 to assume any possible position.

It should be emphasized that this solution is by no means obvious. The fact of "closing" the resistive track prevents the conventional direct measurement based on the application of a reference voltage to the two ends of a track.

As will emerge later in connection with FIG. 4, the application of a reference voltage between any two points on the closed resistive track enables only a measurement indicating two possible positions of the cursor.

The invention does not therefore consist only in closing the resistive track but also in various means enabling the position of the cursor on a track of this kind to be measured reliably and accurately.

FIG. 1 shows an angular position sensor in accordance with the invention.

It is of the potentiometer type and comprises two concentric tracks, a resistive track 1 and a conductive track 2. A cursor 3 mobile about the center of the two tracks short-circuits the two tracks by means of two sliding contacts 4 and 5, for example brush type contacts.

This embodiment is naturally given by way of example only. Numerous other solutions are equally feasible. For example, the conductive track could have a radius greater than that of the resistive track. It could also be reduced to a single point corresponding to the center of the resistive track.

The cursor could equally well move on the resistive track without being physically linked to the rotation axis, the contact being then provided by means of a flying electric lead or any other appropriate means.

Likewise, one or both tracks could be elliptical rather than circular, or more generally of any closed shape. In this case the cursor would advantageously comprise a contact adapted to move in translation to follow the track(s). One solution is to ensure that the two tracks are always the same distance apart.

In the FIG. 1 embodiment the sensor comprises three electric access points A, B and C on the resistive track 1 for application of reference voltages and the conductive track 2 constitutes an access point to the cursor 3 for taking measurements.

The three points A, B, C are equidistant. This condition is not mandatory but makes it possible to simplify the angle calculations, especially in the method explained later.

A stub resistor 6A through 6C is advantageously inserted between each point A, B, C and the resistive track 1. This preserves the linearity of the resistive track and further simplifies the calculations if the value of this resistor is carefully chosen.

The resistance per unit angle of the resistive track 1 is constant. This solution appears particularly simple with respect to both the technical implementation of the sensor and the calculations to be performed.

It is nevertheless feasible to provide a track of varying resistance per unit angle or in sections with different constant resistances (different between each access point, for example).

Hereinafter R1 denotes the value of each of the three stub resistors and R denotes the resistance per unit angle of the resistive track.

The sensor measures the angular position of the cursor 3. In the given example the requirement is therefore to determine the value X (in degrees, for example) of the angle 7 between the cursor 3 and the point A chosen as an arbitrary reference point.

Figure 2:
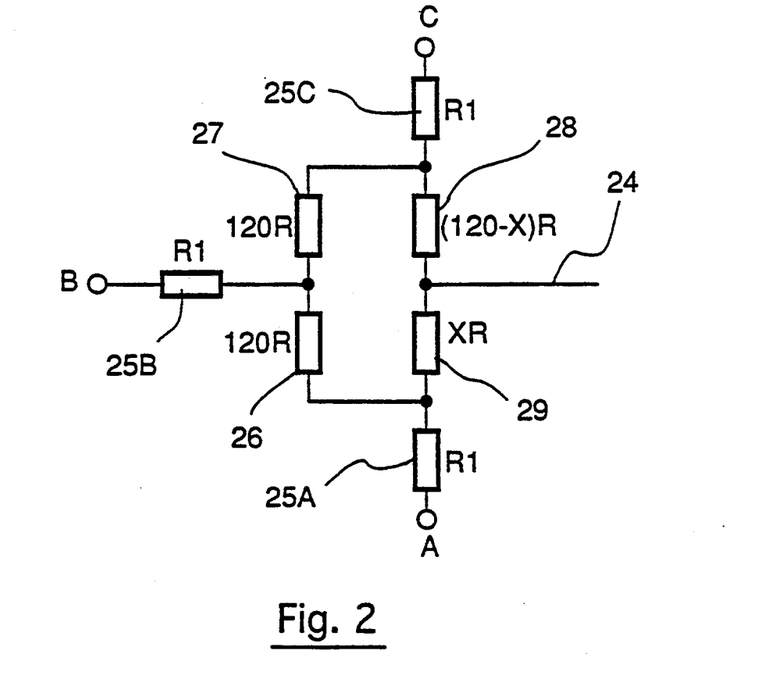
FIG. 2 shows the equivalent electric circuit of the FIG. 1 sensor when the angle to be measured is between 0° and 120°.

FIG. 2 shows the equivalent electric circuit of the sensor if the angle X is less than 120°. It shows the three points A, B, C, the cursor 24 and the three stub resistors 25A through 25C of value R1.

The resistance of the resistive track is distributed as follows:
 two resistors 120 R (26 and 27);
 one resistor X R (29);
 one resistor (120−X) R (28);
or 360 R in total, representing one complete turn.

Two consecutive measurements corresponding to two separate energization configurations are required to determine the exact position of the cursor.

In a first configuration the point A is at a potential VM, the point C is at a potential VP and the point B is not connected.

Figure 3A:
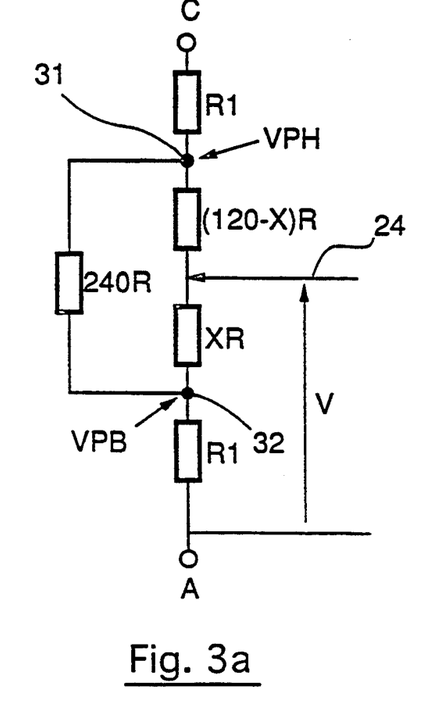
FIGS. 3a and 3b show the equivalent electric circuit of the sensor in a first energization configuration when the angle to be measured is respectively less than and greater than 120°.

FIG. 3a shows the equivalent electric circuit of the sensor if X is less than 120° and with this first energization configuration.

VPH and VPB are respectively the potentials at points 31 and 32.

The cursor voltage V, which is the difference between the potential of the cursor 24 and the potential of the point A, is therefore given by the equation:

$$V = (VPH - VPB) X/120 + VPB \tag{a}$$

Figure 3B:
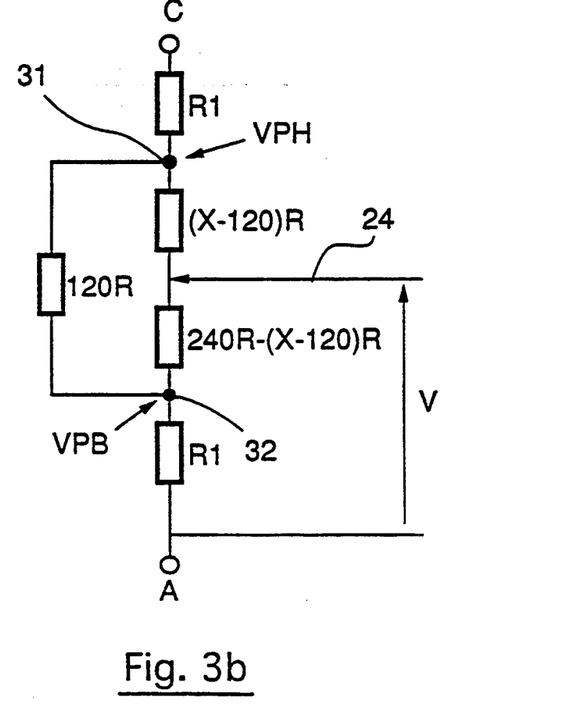

FIG. 3a shows the equivalent circuit of the sensor if X is greater than 120° and with the first energization configuration.

The voltage V of the cursor is given by the equation:

$$V = (VPH - VPB) \frac{[240 - (X - 120)]R}{[240 - (X - 120)]R + (X - 120)R} + VPB \tag{b}$$

that is:

$$V = (VPH - VPB) \frac{360 - X}{240} + VPB$$

Therefore: $V = 1/2 \, (3 \, VPH - VPB) - (VPH - VPB) X/240$

In both cases, equations (a) and (b), the voltage V measured is therefore a linear function of the angle X.

This voltage V is also independent of the value of R.

Figure 4:
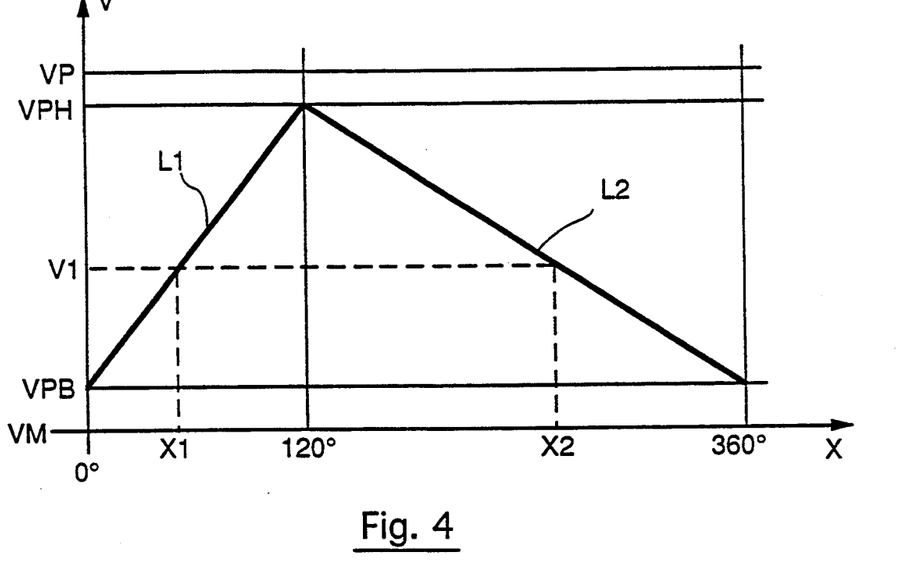
FIG. 4 shows the variation of the voltage representing the cursor position as a function of the angle to be measured in the first energization configuration of FIGS. 3a and 3b.

FIG. 4 shows a curve plotting the variation of the voltage V as a function of the angle X.

As X varies between 0° and 360° (one revolution), V varies between VPB and VPH. The curve comprises two straight line segments L1 and L2 respectively corresponding to the equations (a) and (b).

Following the first measurement a voltage V1 at the cursor at a given time is known. There are then two possible cursor positions X1 and X2 which respectively satisfy the equations (a) and (b), whence:

$$X1 = \frac{(V1 - VPB) \, 120}{VPH - VPB}$$

$$X2 = \frac{(3VPH - VPB - 2V1) \, 120}{VPH - VPB}$$

One of these positions is the actual position of the cursor and the other is an imaginary position. If it is not necessary to know the exact angle, but merely a phase relative to a reference (+X or −X), for example, a single measurement as described above is sufficient if the two access points are symmetrically arranged on the resistive track (there is then no third access point).

In other cases, to determine the actual position of the cursor, a second measurement is carried out using a second energization configuration. The point of application of the potential VP is switched from the point C to the point B. Thus the potential VM is applied to the point A, the potential VP is applied to the point B and the point C is not connected.

The cursor naturally remains at the same position between the two measurements.

Adopting the same reasoning as previously, two new equations are obtained respectively corresponding to the two cases where X is less than and greater than 240°:

$$V = (VPH - VPB) X/240 + VPB \tag{c}$$

$$V = (3 \, VPH - 2 \, VPB) - (VPH - VPB) X/120 \tag{d}$$

Figure 5:
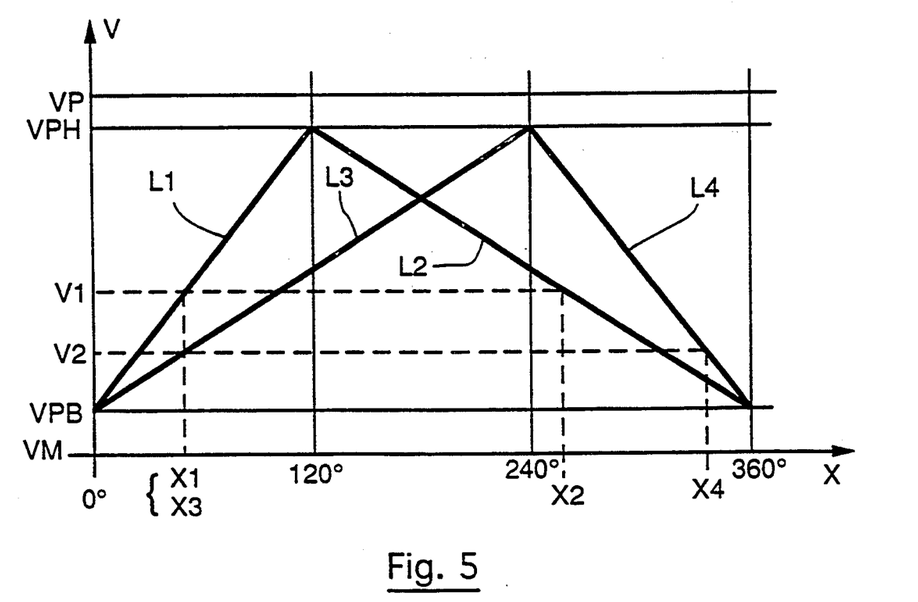
FIG. 5 shows two superimposed curves of variation of the voltage as a function of the angle to be measured corresponding to two energization configurations.

FIG. 5 shows the two curves corresponding to the two energization configurations when superimposed.

It shows the straight line segments L1 and L2 forming the first curve. The second curve likewise comprises two straight line segments L3 and L4 respectively corresponding to the equations (c) and (d).

After the second measurement there is obtained a voltage V2 at the cursor corresponding to the two positions X3 and X4 respectively deduced from the equations (c) and (d):

$$X3 = \frac{(V2 - VPB) \, 240}{VPM - VPB}$$

$$X4 = \frac{(3VPH - 2VPB - V2) \, 120}{VPM - VPB}$$

In the FIG. 5 example, it is seen that X1=X3. This means that X1 is the actual position of the cursor for the two measurements, X2 and X4 being imaginary positions.

It is therefore possible to write the equation:

$$X1 = X3$$

that is:

$$\frac{(V1 - VPB) \, 120}{VPH - VPB} = \frac{(V2 - VPB) \, 240}{VPH - VPB}$$

$$V1 - VPB = 2V2 - 2 \, VPB$$

Whence:

$$V1 = 2 \, V2 - VPB \tag{e}$$

Thus if after a first voltage measurement with VP at C yielding result V1 followed by a second measurement after switching VP from the point C to the point B yielding result V2 and if equation (e) is satisfied by these two measurements, the cursor is at position X1; otherwise the cursor is at position X2.

From this time the exact position of the cursor is known and the calculation can be interrupted. In the event of a sensor malfunction, however, for example if the cursor is not in contact with one of the tracks (for example V1=V2) then application of the previous rule utilizing the equation (e) systematically gives X2 as the cursor position, which is wrong.

To remedy this drawback, and therefore to verify that the sensor is operating correctly, all that is required is to proceed as follows:

if the cursor is in a position between 0° and 120°, then V1 and V2 satisfy equation (e) and the actual position of the cursor is X1 (X1=X3).

if the cursor is in a position between 120° and 240°, then V1 is given by the equation for the straight line segment L2, that is equation (b), and V2 by the equation for the straight line segment L3, that is equation (c). In this case, X2=X3 and:

$$V1 = \tfrac{1}{2}(3VPH + VPB) - V2 \qquad (f)$$

if the cursor is in a position between 240° and 360°, then V1 is given by the equation for the straight line segment L2, that is equation (b), and V2 by the equation for the straight line segment L4, that is equation (d). In this case, X2=X4 and:

$$2V1 = V2 + VPB \qquad (g)$$

finally, if none of the equations (e), (f) or (g) is satisfied, then the sensor is malfunctioning.

Figure 6:
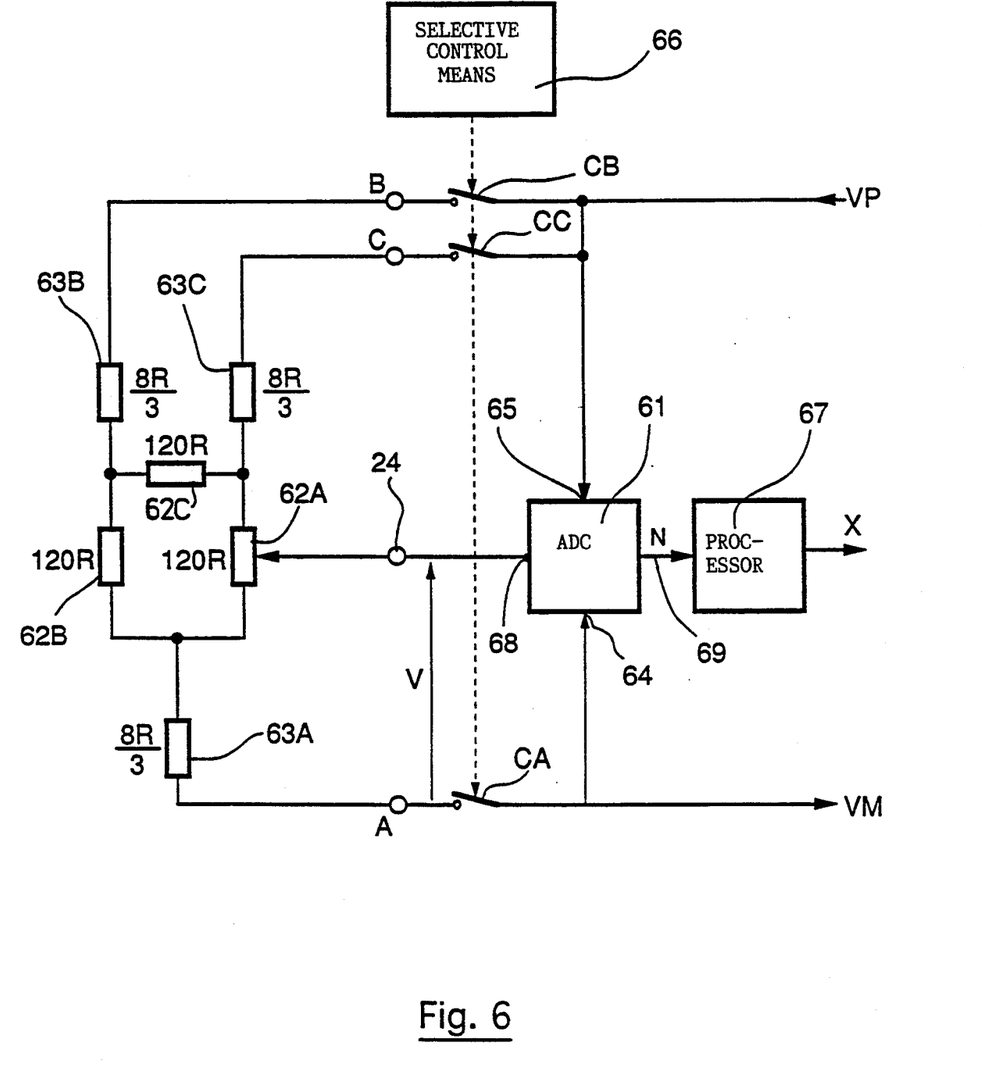
FIG. 6 is a simplified block diagram of a sensor in accordance with the invention including control means for controlling the potential application means and measurement processing means.

FIG. 6 is a simplified block diagram of a sensor comprising selective control means for the potential application means and measurement processing means.

The access points A, B, C are selectively energized by contacts CA, CB, CC controlled by selective control means 66 responsive, for example, to instructions received from a microprocessor controlling the sensor.

The voltage measurement from the cursor 24 is fed to measurement processing means comprising in this example an analog/digital converter 61 and a processor 67 and calculating the measured angle value X. The processor 67 may be implemented in the above-mentioned microprocessor, for example.

The resistive track is represented by the three looped resistances 62A through 62C of value 120 R where R is the resistance of 1° of the resistive circular track.

The value R1 of the three resistors 63A through 63C is 8R/3. As will be explained later, this choice makes it possible to simplify greatly the calculations when the angle value is digitized on eight bits.

The electric access point A is connected to the supply point VM via the contact CA and the electric access points B and C are selectively connected to the supply point VP by the contacts CB and CC.

The cursor 24 is connected to the analog input 68 of an n-bit analog/digital converter 61 which supplies at its output 69 a binary number N proportional to the input voltage V.

The converter supply terminals $V_{ref+}$ 65 and $V_{ref-}$ 64 are respectively connected to the supply points VP and VM.

The cursor voltage V is the difference between the potential of the cursor 24 and the potential of the access point A.

Given these conditions:

$$N = \frac{2^n}{VP - VM} V \qquad (h)$$

The remainder of this explanation concerns conversion on eight bits, that is to say n=8. Generalization is simple.

The equation (h) is therefore written:

$$N = \frac{256}{VP - VM} V \qquad (i)$$

thus:

$$V = \frac{VP - VM}{256} N$$

The impedance of the analog input of the converter is high relative to the impedance of the sensor and the current flowing in the cursor contacts is therefore negligible.

Figure 7A:
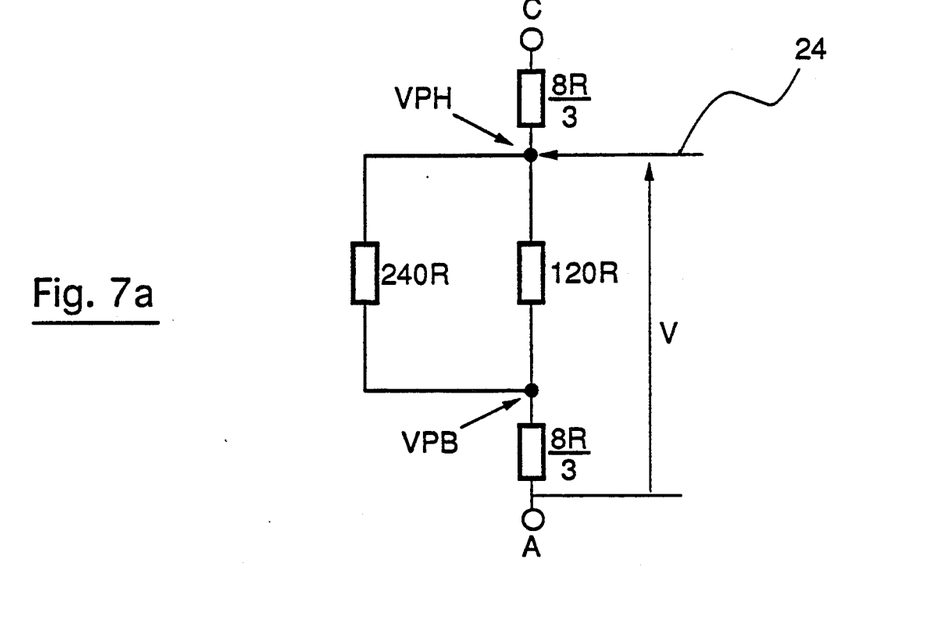
FIGS. 7a and 7b show the equivalent electric circuit of the sensor in a first energization configuration when the angle to be measured is respectively equal to 120° and 0°.

FIG. 7a shows the equivalent circuit of the sensor if the contacts CA and CC are closed, the contact CB is open and the angular position of the cursor is X=120°.

The resistors 240 R and 120 R in parallel are then equivalent to a single resistor 80 R.

In this case the potential VPH is given by the equation:

$$VPH = (VP - VM) \frac{80R + \frac{8R}{3}}{80R + \frac{16R}{3}} \qquad (j)$$

$$VPH = (VP - VM) \frac{248}{256}$$

This value of VHP corresponds to a number NPH at the converter output such that, from equation (i):

$$NPH = \frac{256}{VP - VM} VPH$$

thus:

$$NPH = \frac{256}{VP - VM} \times (VP - VM) \frac{248}{256}$$

Thus: $NPH = 248$

Figure 7B:
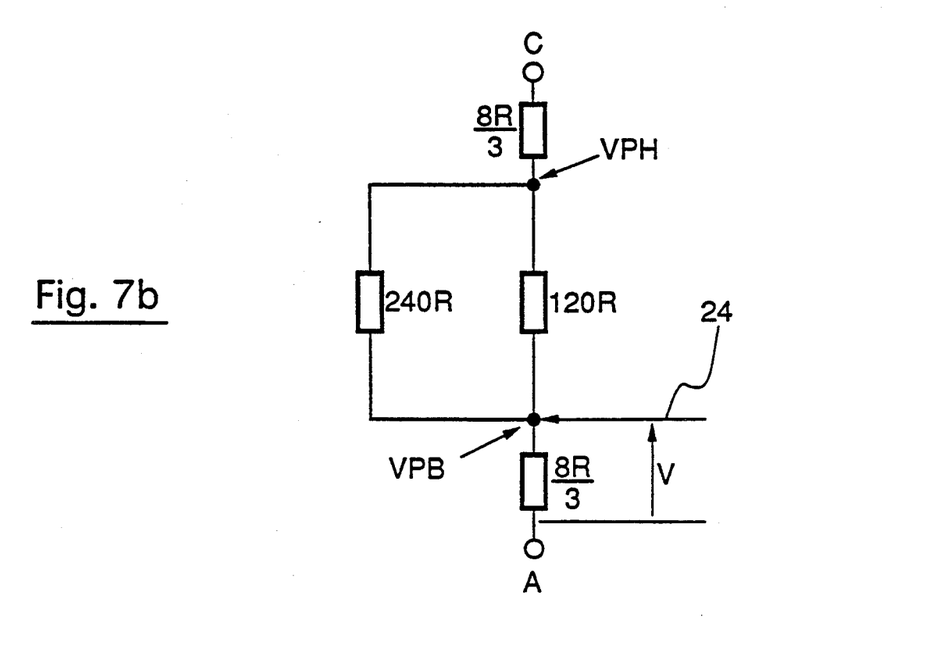

FIG. 7b corresponds to the same energization configuration when the angular position of the cursor is X=0°.

The potential VPB is given by the equation:

$$VPB = (VP - VM) \frac{\frac{8R}{3}}{80R + \frac{16R}{3}} \qquad (k)$$

$VPB = (VP - VM) 8/256$
thus: $VPB = (VP - VM) NPB/256$
thus: $NPB = 8$

Thus for X varying from 0° through 120°, N varies from 8 through 248. If X varies by 1°, N varies by 2. If N is required to vary by 1 for each degree travelled by the cursor, a simple calculation shows that a value R1=136/3R must be chosen for R1.

Taking the equations (a), (b), (c), (d) and substituting for VPH and VPB from equations (j) and (k), and finally by comparison with the equation (i), three simple equations are obtained in terms of X and N. For example, for equation (a):

$$V = (VPH - VPB)\frac{X}{120} + VPB$$

-continued $$V = \left[\left(\frac{VP - VM}{256} \times 248\right) - \left(\frac{VP - VM}{256} \times 8\right)\right]\frac{X}{120} + \frac{VP - VM}{256} \times 8$$

$$V = \frac{VP - VM}{256}(2X + 8)$$

thus, from equation (i):

$$V = \frac{VP - VM}{256} \times N$$

thus: $N = 2X + 8$ that is: $X = \frac{N}{2} - 4$

Therefore X=0 if N=8 and X=120 if N=248. The same process applied to equations (b), (c) and (d) respectively yields:

$$X = 368 - N \quad (m)$$

$$X = N - 8 \quad (n)$$

$$X = 364 - N/2 \quad (p)$$

After the first measurement carried out with the contacts CA, CC closed and the contact CB open, two possible positions X1 and X2 are obtained as a function of N1:

$$X1 = N1/2 - 4$$

and $$X2 = 368 - N1$$

After the second measurement carried out with the contact CC open and the contacts CA, CB closed, two new possible positions X3 and X4 are obtained as a function of N2:

$$X3 = N2 - 8$$

and $$X2 = 364 - N2/2$$

Summarizing the four possible cases:
if the cursor is between 0° and 120°, then X1=X3, thus:

$$N1/2 - 4 = N2 + 8$$

thus:

$$N1 = 2N2 + 4 \quad (q)$$

if (q) is satisfied, then X=N2−8
if the cursor is between 120° and 240°, then X2=X3, thus:

$$368 - N1 = N2 - 8$$

thus:

$$N1 + N2 = 360 \quad (r)$$

if (r) is satisfied, then X=N2−8
if the cursor is between 240° and 360°, then X2=X4, thus:

$$368 - N1 = 364 - N2/2$$

thus:

$$N1 = N2/2 + 4 \quad (s)$$

if (s) is satisfied, then X=368−N1
if none of the above three equations (q), (r), (s) is satisfied, then the sensor is faulty.

Figure 8:
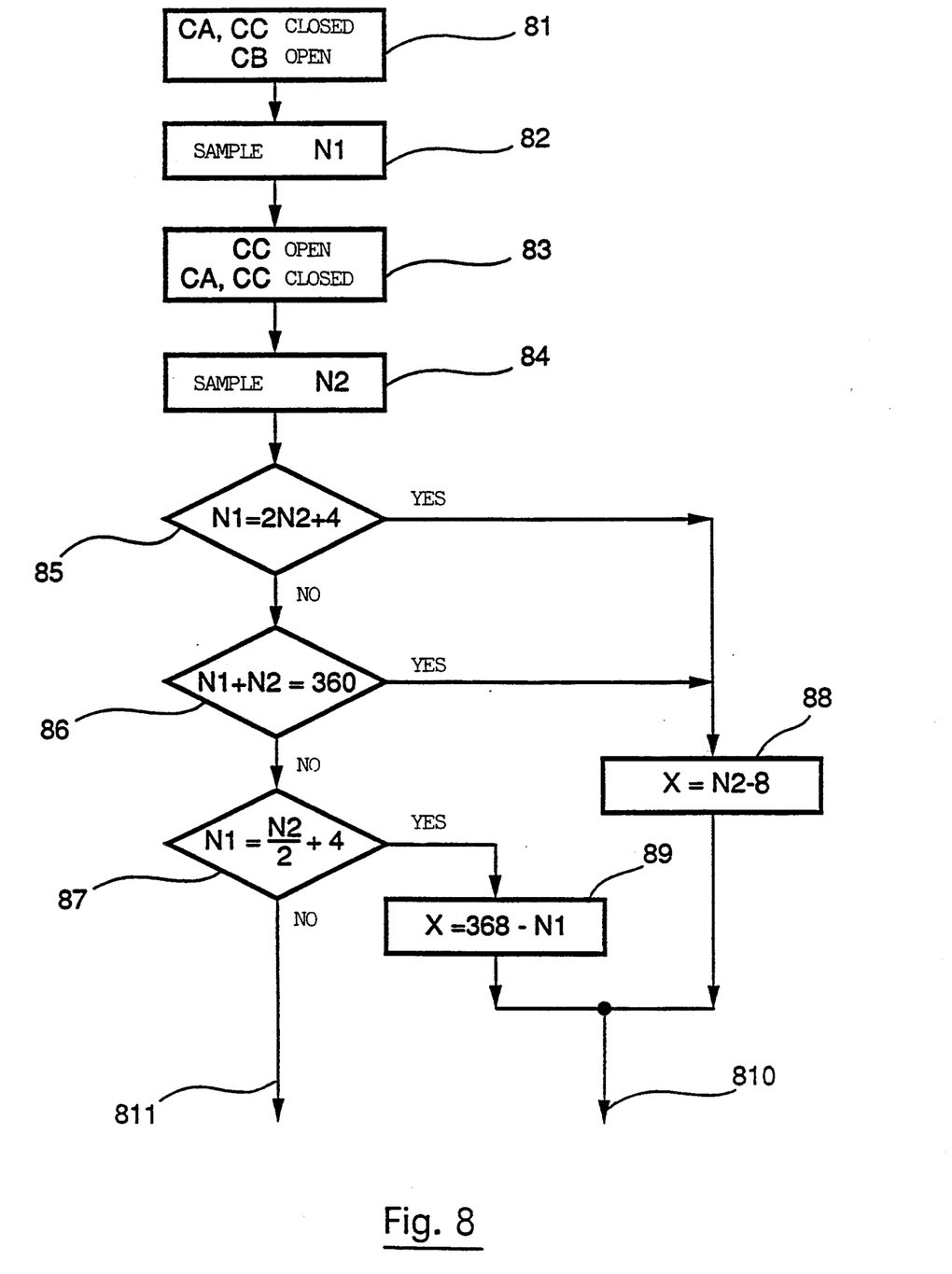
FIG. 8 is a flowchart of a method for determining the angular position of the sensor and verifying that the sensor is operating correctly.

FIG. 8 is a flowchart summarizing the method of obtaining the angular position X of the sensor and verifying that the sensor is operating correctly as described above.

A first step 81 corresponds to the first energization configuration: CA and CC are closed, CB is open.

With this configuration, a first value N1 at the converter output is sampled and stored in a second step 82.

A third step 83 corresponds to the second energization configuration: CA and CB are closed, CC is open.

In this configuration a second value N2 at the output of the converter 61 is sampled and stored in a fourth step 84.

In the next step 85 the two numbers N1 and N2 are substituted in the equation N1=2N2+4. If this equation is satisfied, the angular position X of the sensor is calculated in a final step 88 using the equation X=N2−8.

Otherwise, N1 and N2 are substituted in the equation N1+N2=360 in a further step 86. If this equation is satisfied, the angular position X(=N2−8) is calculated in the same step 88 as previously; otherwise N1 and N2 are inserted in a third predetermined equation: N1=N2/2+4 in a further step 87.

If this third equation is satisfied, the angular position X is calculated in a final stage 89 using a predetermined equation (X=368−N1); otherwise the conclusion is that the sensor is faulty (811).

Thus if any of the three tests gives a positive result it is possible to calculate X and the result is reliably correct (810).

On the other hand, if the three tests give a negative result it is not possible to calculate X and it is certain that the sensor is faulty (811).

This flowchart is naturally given by way of example only. It has the advantage of requiring only simple calculations that are easy to implement in the microprocessor. In particular, it does not require any multiplication, only addition and binary shifting.

However, many other calculation methods may be feasible.

More generally, a sensor in accordance with the invention may be implemented in other configurations. More than three access points to the resistive track could be provided, for example the supply points (here on the track) and the measurement points (here on the cursor) could be interchanged, and so on.

Figure 10:
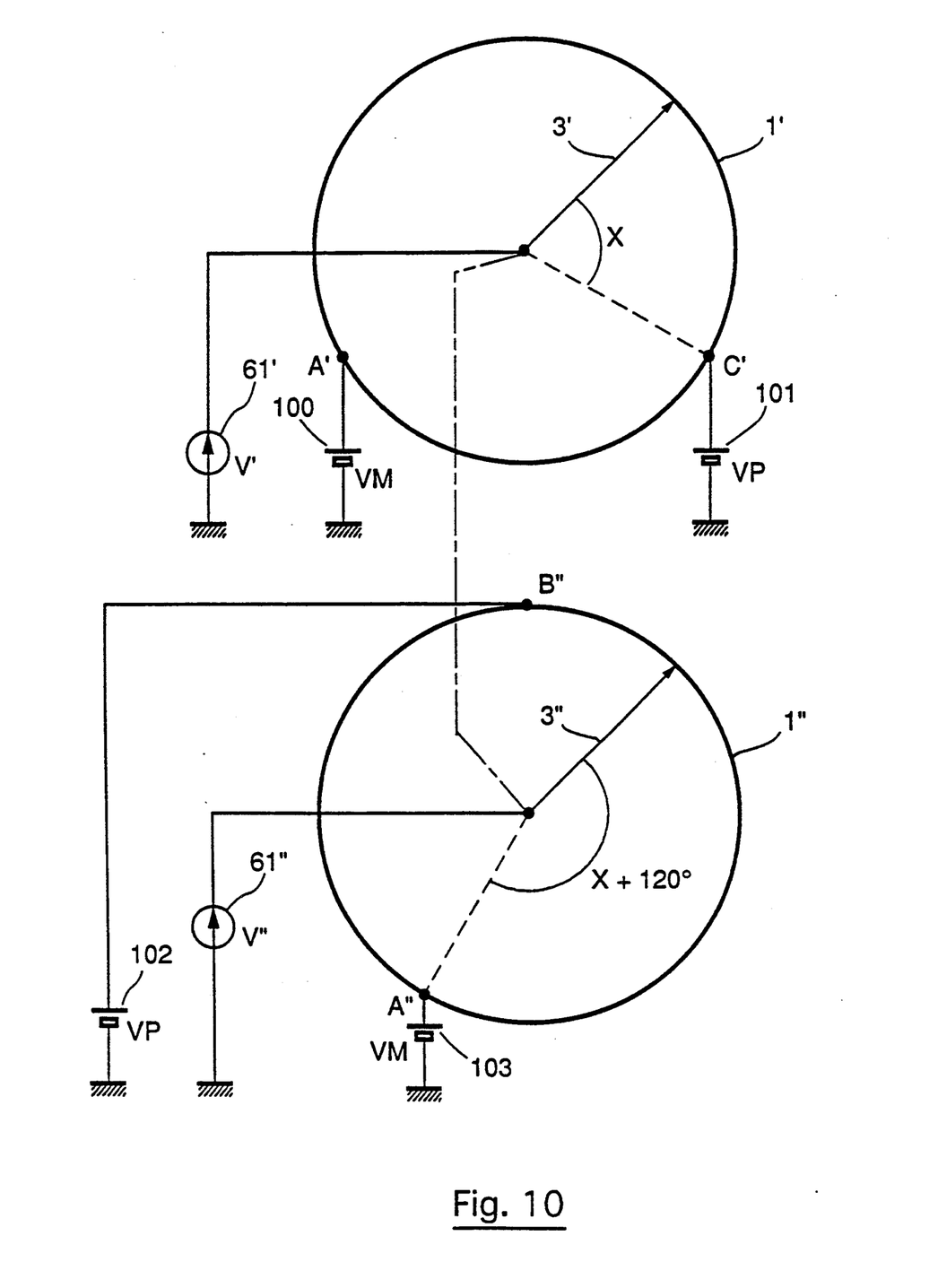
FIG. 10 shows a combination of two circuits juxtaposed to illustrate a double-cursor variant.

It is also feasible to use a double cursor (3′, 3″) as shown in FIG. 10.

Each cursor 3′, 3″ then has its own conductive track. In this case two access points (A′, C′, A″, B″) to the resistive track 1′, 1″ are sufficient for applying the reference voltage. The simultaneous measurement at a given time of the voltage V′, V″ at each cursor enables the absolute position of one of the cursors to be deduced.

There is claimed:

1. An angular position sensor comprising:
   at least one closed continuous resistive track having at least three access points defined thereon and at least one cursor adapted to move while in electrical contact with said at least one track;
   means for applying a first energization configuration wherein a potential VM is applied to an access point A, a potential VP is applied to an access point C, and an access point B is not energized;
   first means for measuring the potential at said cursor, and converting the measured value into a binary number N1;
   means for applying a second energization configuration wherein the potential VM is applied to an access point A, the potential VP is applied to the access point B, and the access point C is not energized;
   second means for measuring the potential at said cursor again, and converting the second measured value into a binary number N2;
   means for determining the angular sector containing said cursor, an angular sector being delimited by two of said access points, and
   means for determining an angular position X of said cursor with respect to a predetermined reference point based on the measured potentials.

2. A sensor according to claim 1 wherein said at least one closed continuous resistive track has a constant resistance per unit angle.

3. A sensor according to claim 1 wherein said at least one closed continuous resistive track has access points to said tracks equidistant from each other along respective ones of said tracks.

4. A sensor according to claim 1 wherein a stub resistor is inserted between each access point and said applying means.

5. A sensor according to claim 1 wherein said first measuring and second means comprise:
   an analog/digital converter whose analog input is connected to said cursor,
   means for analyzing at least two values supplied by said converter and delivering data proportional to the angular position of the cursor.

6. A sensor according to claim 1 wherein a stub resistor is disposed at each access point to said at least one resistive track and said stub resistors have a value substantially equal to 8R/3 where R is the resistance per unit angle of said resistive track.

7. A method for measuring the angular position of a cursor which is in electrical contact with a closed continuous resistive track, said track having three access points defined thereon, said method comprising the steps of:
   applying a first energization configuration wherein a potential VM is applied to an access point A, a potential VP is applied to an access point C, and an access point B is not energized;
   measuring the potential at said cursor, and converting the measured value into a binary number N1;
   applying a second energization configuration wherein the potential VM is applied to an access point A, the potential VP is applied to the access point B, and the access point C is not energized;
   measuring the potential at said cursor again, and converting the second measured value into a binary number N2;
   determining the angular sector containing said cursor, an angular sector being delimited by two of said access points, and
   determining an angular position X of said cursor with respect to a predetermined reference point based on the measured potentials.

8. A method according to claim 7 wherein:
   said step of determining said angular sector comprises a series of successive tests of the validity of three predetermined equations in terms of N1 and N2;
   said step of determining said angular position comprises a calculation on the basis of said predetermined equations.

9. A method according to claim 8 further comprising a step of detecting malfunctioning of the sensor if none of said three equations is satisfied.

* * * * *